April 17, 1973  B. R. WHITE  3,728,198
APPARATUS FOR PACKAGING ROOFING ELEMENTS AND PROCESS
Filed Jan. 19, 1970  15 Sheets-Sheet 1

INVENTOR
BOYCE ROBERT WHITE
BY
Mason, Mason & Albright
Attorneys

INVENTOR
BOYCE ROBERT WHITE
BY
Mason, Mason & Albright
Attorneys

April 17, 1973  B. R. WHITE  3,728,198
APPARATUS FOR PACKAGING ROOFING ELEMENTS AND PROCESS
Filed Jan. 19, 1970  15 Sheets-Sheet 7

INVENTOR
BOYCE ROBERT WHITE
BY Mason, Mason & Albright
Attorneys

April 17, 1973   B. R. WHITE   3,728,198
APPARATUS FOR PACKAGING ROOFING ELEMENTS AND PROCESS
Filed Jan. 19, 1970   15 Sheets-Sheet 9

Fig.12

INVENTOR
BOYCE ROBERT WHITE
BY
Mason, Mason & Albright
Attorneys

April 17, 1973   B. R. WHITE   3,728,198
APPARATUS FOR PACKAGING ROOFING ELEMENTS AND PROCESS
Filed Jan. 19, 1970   15 Sheets-Sheet 10

Fig.14

INVENTOR
BOYCE ROBERT WHITE
BY
Mason, Mason & Albright
Attorneys

INVENTOR
BOYCE ROBERT WHITE
BY
Mason, Mason & Albright
Attorneys

Fig.18

April 17, 1973 B. R. WHITE 3,728,198
APPARATUS FOR PACKAGING ROOFING ELEMENTS AND PROCESS
Filed Jan. 19, 1970 15 Sheets-Sheet 15

INVENTOR
BOYCE ROBERT WHITE
BY
Mason, Mason & Albright
Attorneys

United States Patent Office 3,728,198
Patented Apr. 17, 1973

3,728,198
APPARATUS FOR PACKAGING ROOFING ELEMENTS AND PROCESS
Boyce Robert White, Orlando, Fla., assignor to Boyce Robert White, Inc., Orlando, Fla.
Continuation-in-part of application Ser. No. 760,765, Sept. 19, 1968, now Patent No. 3,566,562. This application Jan. 19, 1970, Ser. No. 3,717
Int. Cl. B32b *31/10;* E04d *15/07*
U.S. Cl. 156—552                                 3 Claims

ABSTRACT OF THE DISCLOSURE

A plurality of asphalt shingles, customarily having dimensions one by three feet and cut-outs spaced a foot apart, are stacked in an inverse cupped disposition. The stack so-cupped is placed on a shingle feed device disposed over an endless belt-like member which has parallel spacing bars disposed perpendicular to the direction of travel of the endless member and which are spaced apart five inches from leading edge to leading edge. Each spacing bar slices off the lower of the cupped shingles held in the feed device which are carried therefrom by the endless member, a single shingle being carried by each spacing bar whereby each shingle is overlapped by the following shingle the same amount as would occur on a roof except that the shingles are inverted and, at this point, not staggered laterally. Under the overlapped shingles, a pair of diverging chains have stagger plates extending outwardly therefrom, the chains moving at about the same speed as the endless member so that the stagger plates each engage one of the cut-out portions of each shingle and cause the shingles to move alternately outwardly so as to be staggered laterally as they would be on a roof. Resiliently biased fingers engage the shingles on the moving member to ensure alignment with the spacing bars and a series of rollers on each side bear against the edges of the shingles finely to adjust their lateral position. Hot, quick acting glue is then applied from above the endless member to the exposed shingles in a predetermined pattern and extensible Kraft paper which is two feet in width is applied from an overhead roll under a compression belt to the center of the array of shingles whereby the shingle array is glued by intermittently applied beads of glue to the Kraft paper on a continuous basis. The Kraft paper is thereafter cut so as to connect only a predetermined number of shingles—say twenty—into a single array which are moved off the end of the endless belt by gravity and down a slide into a container. As the array is received in the container, the paper automatically folds between the individual shingles in an accordion-like manner. The container is inverted and secured, and the array, when opened, may be easily extended on the roof deck to its desired position. In a modification, the desired stagger plates can be on a converging chain under the endless member and brought to bear against the edges of the shingles rather than the cutouts. In any event, the cut-outs can be a slit rather than spaced slots and the shingles need not be of the asphalt type.

CROSS-REFERENCES TO RELATED APPLICATIONS

This application is a continuation-in-part of my application Ser. No. 760,765 filed Sept. 19, 1968, now Pat. No. 3,566,562.

BACKGROUND OF THE INVENTION

This invention relates to a method and apparatus for packaging an array of shingles attached to one or more flexible backing members so as subsequently to unfold in the relative staggered position the shingles are intended to assume on the roof deck.

Presently, if a new roof is not to be applied directly over an old roof, the old shingles and underlying felt are manually removed down to the wood deck of the section intended for new roofing. After a section is so removed, a new roof should be applied as soon as possible to avoid complications and damage which may result from precipitation on an unshingled roof deck. However, conventional roofing methods now in use generally preclude expeditious application of the shingles. Thus, unanticipated adverse weather conditions may seriously damage a house where a portion or all of the roof has been removed. With conservative roofers, an existing roof will not be removed for the purpose of applying a new roof when there is any likelihood of rain before the application of the new shingles can be finished.

Conventional roofing comprises the initial step, after the old roofing is removed, of applying a roofing felt, which is generally a saturated asphalt felt, in horizontal strips to the roof section involved. Thereafter, the roof is measured and chalk lines are struck vertically and horizontally to provide for alignment of the shingles. Next, the shingles are applied manually one at a time by holding the upper and side edges to the appropriate horizontal and vertical chalk lines, respectively, and at the same time fastening the shingle so positioned to the roof deck by nails or other fastening devices.

Methods for speeding up the process of laying shingles are described in my U.S. Pat. No. 3,438,170 of Apr. 15, 1969, and in my copending application Ser. No. 815,801 filed Apr. 14, 1969. This patent and application disclose mechanisms for applying individual shingles and securing same at the proper location of the roof deck with great rapidity. Although these devices have proved commercially advantageous over known conventional methods of roofing, still the entire section to be roofed must have the old shingles removed and the danger which exists in the events of intervening adverse weather conditions is only alleviated to some extent by the speed of the process. In addition, the inventions disclosed in my above-mentioned patent and copending application require the use of and some familiarity with the apparatus which is mounted on the roof section involved.

In my copending application, Ser. No. 760,765, of which this application is a continuation-in-part, I disclose a system wherein shingle members can be applied with even more rapidity than is possible with the system set forth in my above-mentioned U.S. Pat. No. 3,438,170 and the copending application Ser. No. 815,801, without the necessity of mounting special apparatus over the roof section and which minimizes difficulties and dangers which may arise due to unanticipated precipitation.

The system set forth in my application Ser. No. 760,765 involves the pre-positioning of the shingles within a package by means of a connecting member which is folded in an accordion-like fashion and attached to each of the shingles. When the shingles are pulled out of the package, each shingle is positioned vis-a-vis the other shingles in the package in the same relative position that they are intended to assume on the roof deck. Such arrays of shingles are opened on the roof deck and quickly secured thereto. Not only is the system much more rapid, but also special equipment is not necessary and the dangers of intervening foul weather are alleviated to a considerable degree.

The ultimate economies of the foregoing system are dependent in large measure on the efficiency and additional cost which may ensue from the packaging process. Accordingly, it is an object of the instant invention to provide improved mechanisms and methods for packing shingles in conformity with the above system.

SUMMARY OF THE INVENTION

In the preferred inventive concept, the shingles are positioned on a continuous and automatic basis face down on a continuously moving endless member at the location they will occupy relative to each other but, however, in the inverted sense, on the roof deck. So positioned, a foldable member is continuously applied to and secured to each shingle member as it moves relative to the source for the foldable member. At predetermined intervals, the foldable member is severed so that a predetermined array of shingles is secured to the severed portion of the foldable member which is adapted to be gathered in a package wherein the shingles are stacked and the foldable member is disposed accordion-like between the bases of the shingles. It has been discovered that the cupping of a stack of asphalt shingles in an inverted position improves the feeding of same from the bottom of the stack one by one onto the moving endless member in their desired spaced relationship. Also, it has been discovered that an array of shingles connected by a foldable member will slide by gravity from a flat disposition automatically into the desired stacked position with the foldable member disposed in an accordion-like fashion between the individual shingles.

With the preferred concept, the arrays of shingles can be made as long or as short as desired and the capacity exists to load a transportation vehicle such as a flat bed truck in a bulk manner directly from the apparatus of the invention.

The system is adaptable to most known types of shingles including doubled shingles and provides increased flexibility in the design of shingle patterns including the so-called "random" arrangements.

Other adaptabilities and capabilities will appear as the description progresses, reference being had to the accompanying drawings, in which:

BRIEF DESCRIPTION OF THE DRAWINGS

FIG. 8 is a perspective view of the shingle feed mechanism seen also in FIGS. 6a and 7;

FIG. 13 is a perspective top view showing the endless member immediately following the shingle feed mechanism with two asphalt shingles in the process of being staggered laterally;

DESCRIPTION OF THE PREFERRED EMBODIMENTS

Figures 1, 2:
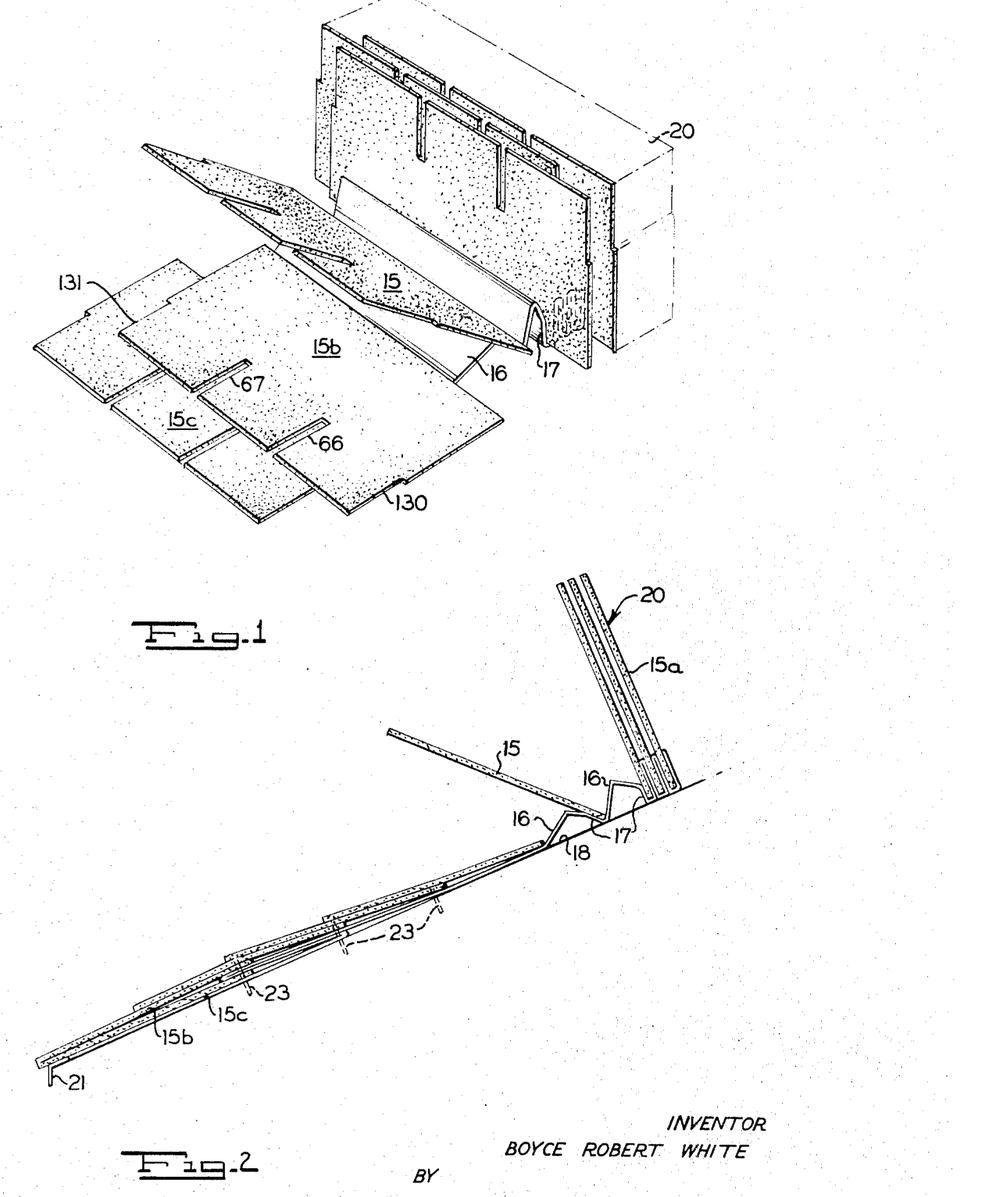
FIG. 1 shows in perspective an array of shingle members which have been partly opened to illustrate how the shingle members are connected together.
FIG. 2 is a side view of an array showing the trailing shingles connected to a roof deck.

Referring now to FIGS. 1 and 2, the roofing elements comprise shingle members 15 which are each a conventional twelve by thirty-six inch asphalt strip shingle. Each shingle member 15 is connected at its upper edge, relative to the slope of the roof, to limiting means comprising a foldable member which is composed of extensible kraft paper 16 or other suitable material. It will be noted that in the packaged form, Kraft paper 16 is folded in a pleated or accordion-like fashion and has shingle members 15 attached thereto at regular intervals 17 by glue or other appropriate securing means. Preferably the location of the securing interval 17 is on the underside of each shingle member 15 and at its upper aspect relative to its position on the roof deck 18. When folded, the shingle members 15 are in an array designated 20 and kraft paper 16 has a single fold between each pair of adjacent shingle members 15 in array 20. The top shingle 15a of array 20 is considered to be the leading shingle, and the last shingle 15c is considered the trailing shingle. In most applications, the trailing shingle 15c is doubled with the next-to-last shingle 15b. A metallic or plastic eaves drip 21 may, if desired, be attached to the trailing shingle 15c.

Figure 3:
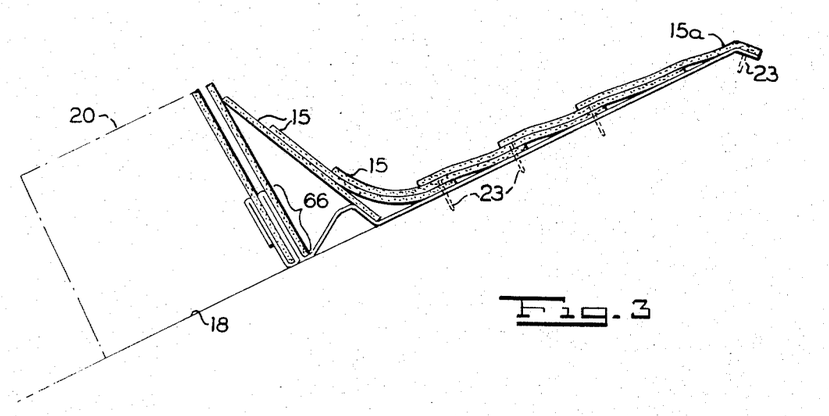
FIG. 3 is a side view showing an array with the leading shingle attached to the roof ridge.
Figure 4:
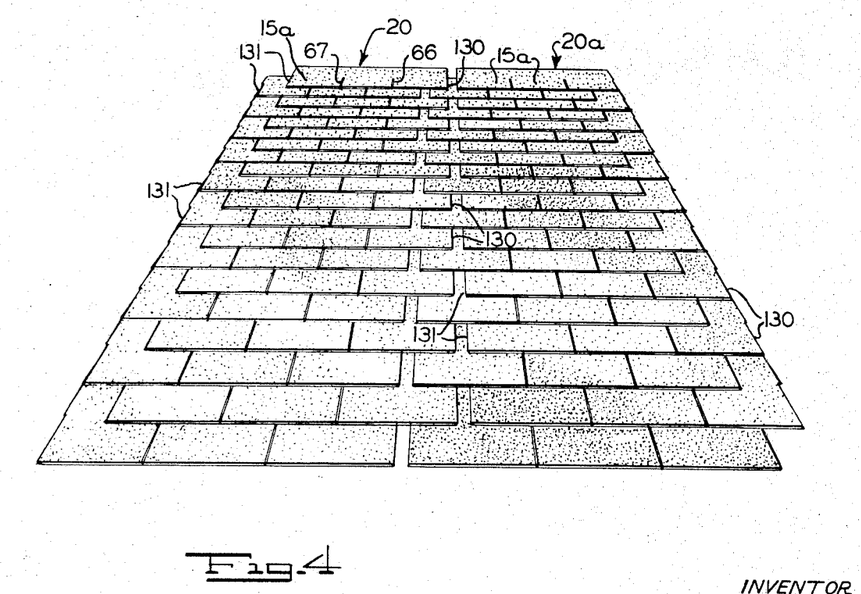
FIG. 4 shows two arrays of shingles laid out side-by-side in interlocking engagement but slightly separated to illustrate the cooperation of the shingle arrays in accordance with the invention on a roof deck.
Figures 5, 6B:
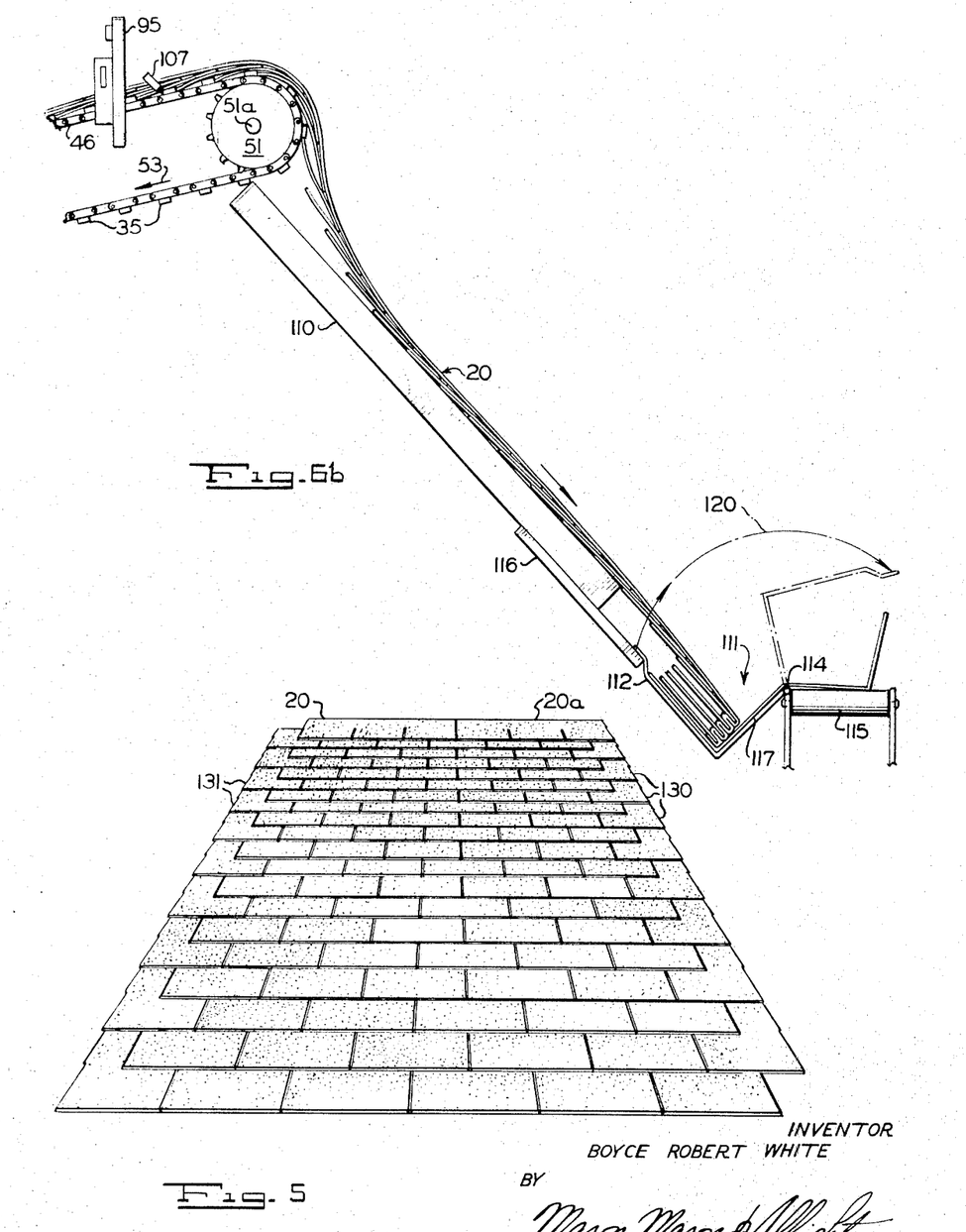
FIG. 5 shows the same arrays as FIG. 4 being, however, interlocked as they would be in their secured position on a roof deck.
FIGS. 6a and 6b illustrate, in a diagrammatic manner, the preferred apparatus for producing and packaging the arrays illustrated in the previous figures.

In applying the shingles to an already roofed section, first a path of shingles slightly greater than the width of array 20 is removed and the leading shingle 15a of array 20 is attached to the ridge of the roof deck 18, so cleared. Array 20 is then pulled away from the roof ridge down roof deck 18 to a position where the next-to-last shingle 15b overlaps the edge of roof deck 18. If array 20 is too long for this purpose, it is necessary to remove one or several of the last shingles. If one array 20 is too short, one or more further arrays may be added. Shingle 15c is doubled under shingle 15b by sliding it to a position as shown in FIG. 2. Array 20 is secured in place to roof deck 18 by staples 23 or other appropriate securing means. It will be appreciated that, if desired, shingles 15b and 15c can first be secured and array 20 moved upwardly along roof deck 18 whereby the leading shingle 15a is subsequently secured to the ridge of the roof. This method, however, is not preferred since it is easier initially to place the pre-packaged array 20 at the roof ridge to take advantage of gravity by moving same down the roof deck 18 to the eaves. FIG. 3 shows an array in such disposition. FIGS. 4 and 5 show a pair of arrays 20 and 20a. In FIG. 4, arrays 20 and 20a have their adjacent edges in an overlapped condition, but still short of the desired relationship which is shown in FIG. 5.

Figure 6:
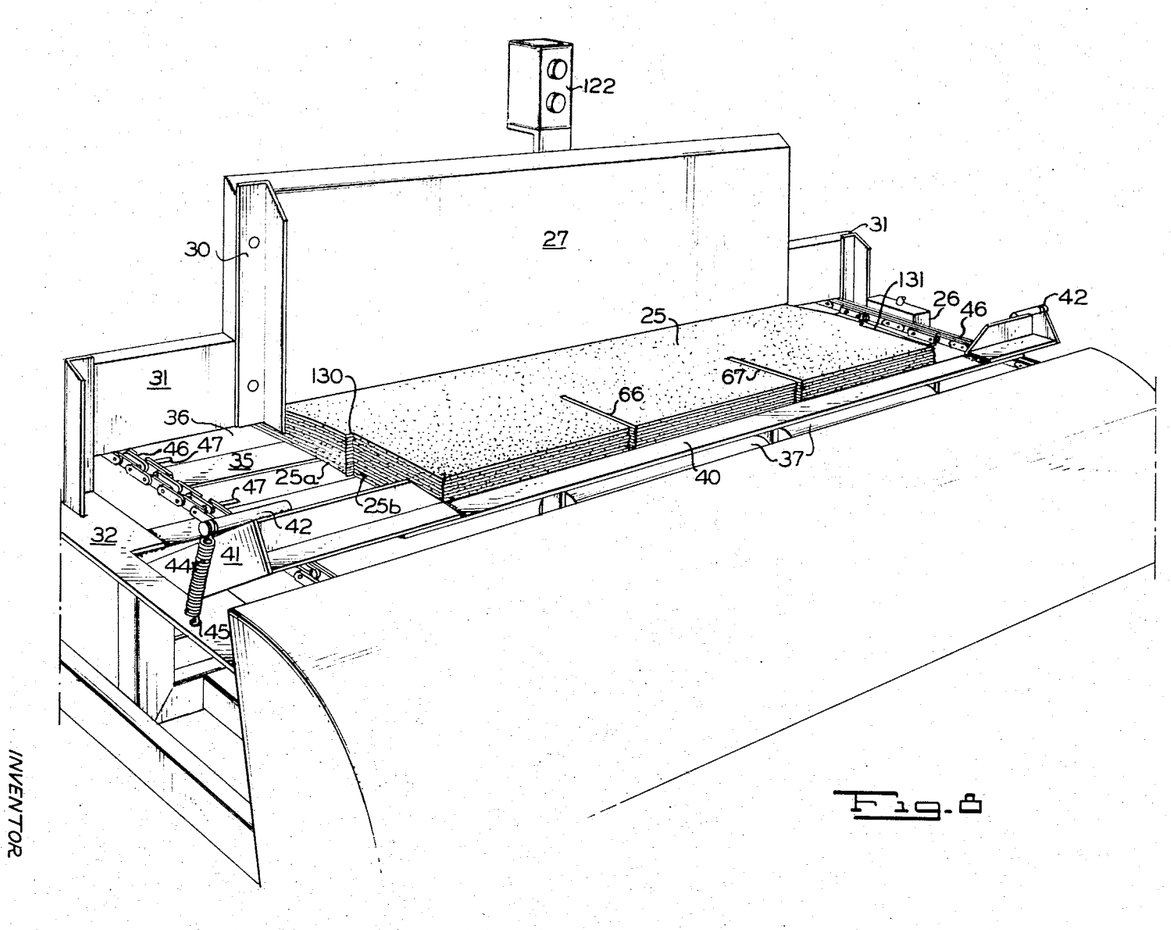
Figure 6A:
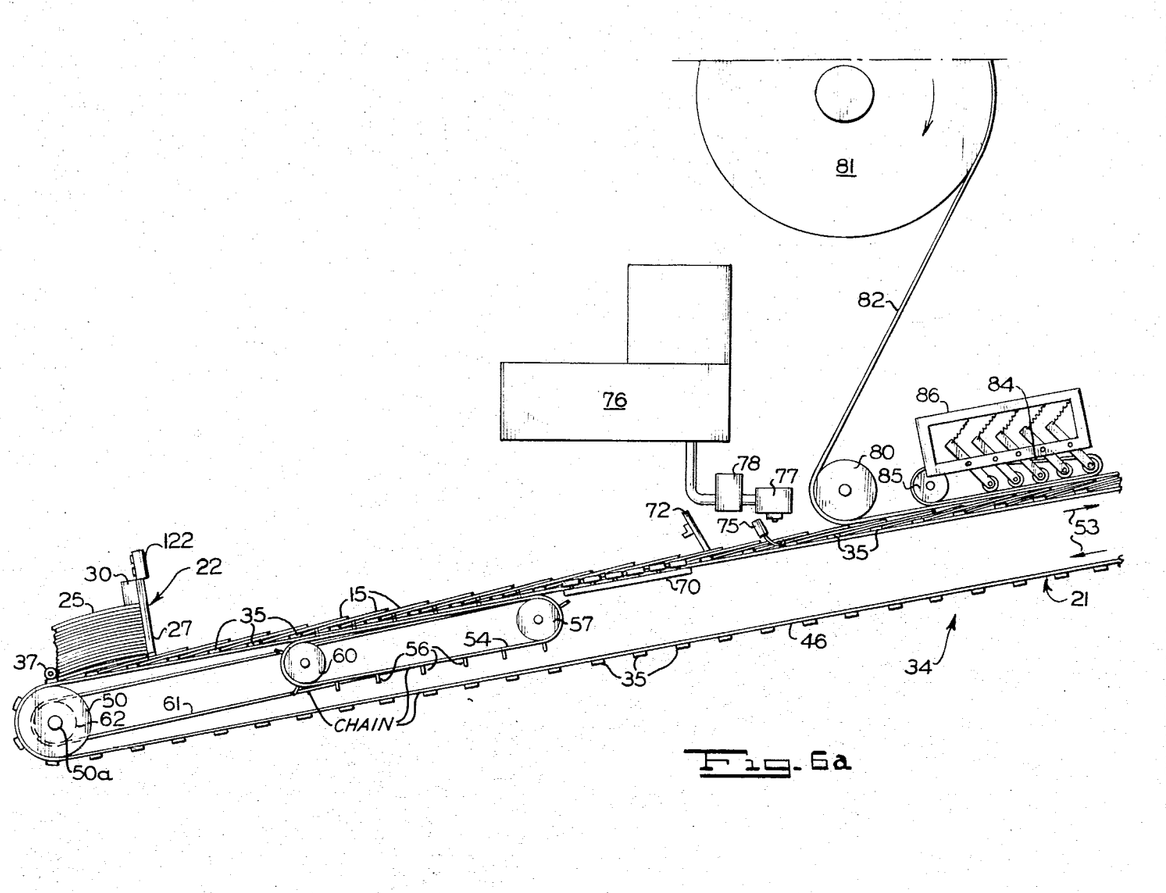
Figure 7:
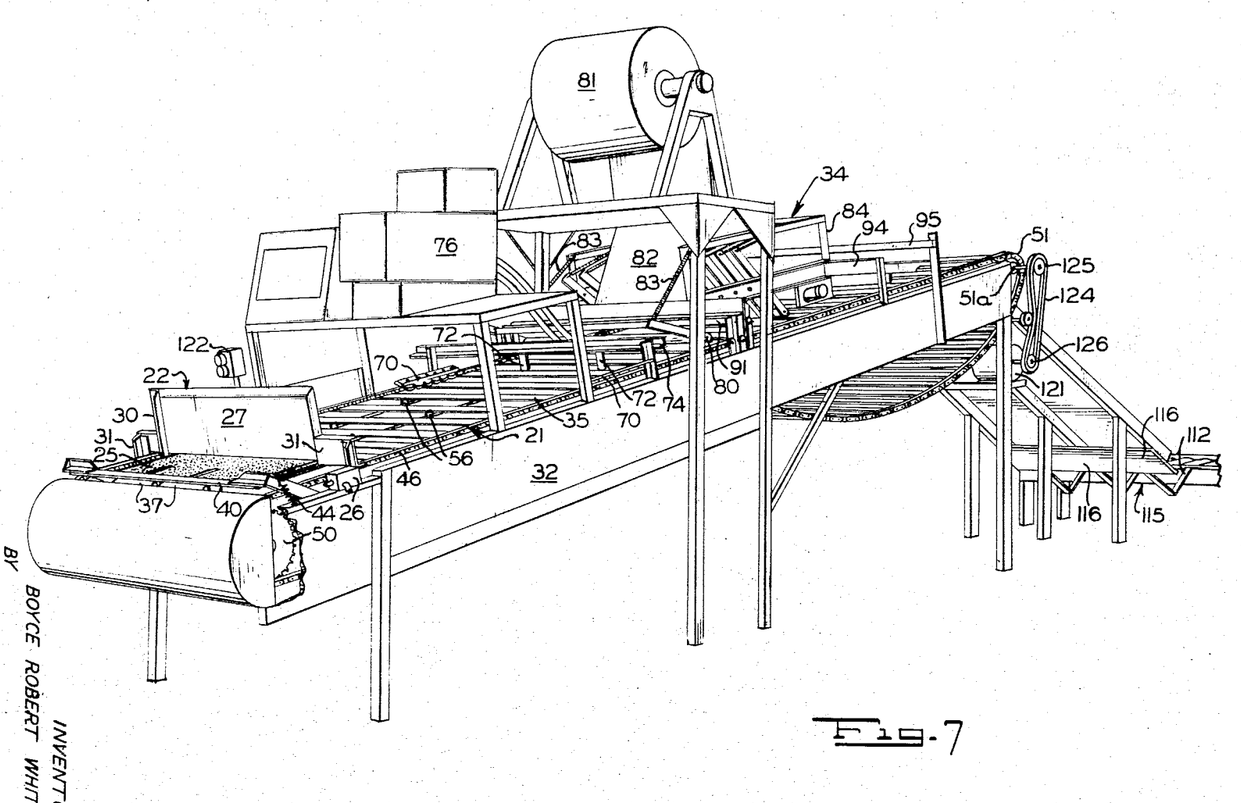
FIG. 7 is a perspective view of the apparatus shown diagrammatically in FIGS. 6a and 6b.

FIGS. 6a and 6b show the disposition of the various mechanisms in a diagrammatic manner for producing and packaging the shingle arrays illustrated in FIGS. 1-5. FIG. 7 is a perspective view which shows the packaging apparatus with various components thereof mounted above the endless member designated generally 21. As illustrated in FIGS. 6a, 6b, 7 and 9, the shingles are supplied to a shingle feed mechanism 22 in an inversely cupped fashion. It has been found in practice that cupping of the shingles is an important prerequisite to insure proper feeding. The cupping may be obtained by providing an underlying longitudinal support such as a series of rollers 24 which support the stack of shingles 25 centrally immediately prior to its transfer to feed mechanism 22 so that the edges tend to fold over and produce in the shingle stack 25 the desired cupped relationship.

The shingle feed mechanism 22 comprises a back board 27 which has a vertical guide 30 connected thereto and which is mounted on brackets 31 connected to the frame 32 of the packaging apparatus designated generally 34. However, on the right-hand bracket 31 an industrial eccentric-type vibrator 26 is connected. Back board 27 is mounted by the brackets 31 so as to be raised slightly greater than the thickness of two shingles in stack 25 above the top of the spacing bars 35 when they pass thereunder. The spacing bars 35 are mounted on endless member 21 so as to be perpendicular to its direction of travel, parallel with each other and spaced apart five inches from leading edge to leading edge. The spacing bars 35 travel along a table 36 mounted thereunder on frame 32 and each spacing bar 35 has approximately the same thickness as the individual shingles of the shingle stack 25. Thus, from FIG. 10 it will be noted that a bar 35 pushes against a lower shingle 25a of shingle stack 25. At the same time, the next bottom shingle 25b is held in place by the weight of the shingle stack 25 stopped by back board 27 until contacted by the next succeeding spacing bar 35.

Alignment of the spacing bar 35 just prior to its contact with the shingle 25a is insured by a pair of rollers 37 mounted on a bar 40 which is pivoted on frame 32 by brackets 41 hingedly extending therefrom which are connected to each end of the bar 40. A stud 42 extends from one end of the bar 40 and has connected to one end thereto an extension spring 44 which is secured on its lower end in an opening 45 in frame 32. Rollers 37 are thus biased downward against the spacing bars 35 to prevent them from bowing upward and insure that only one shingle is sliced from the bottom of the shingle stack 25 by each spacing bar 35.

Figure 10:
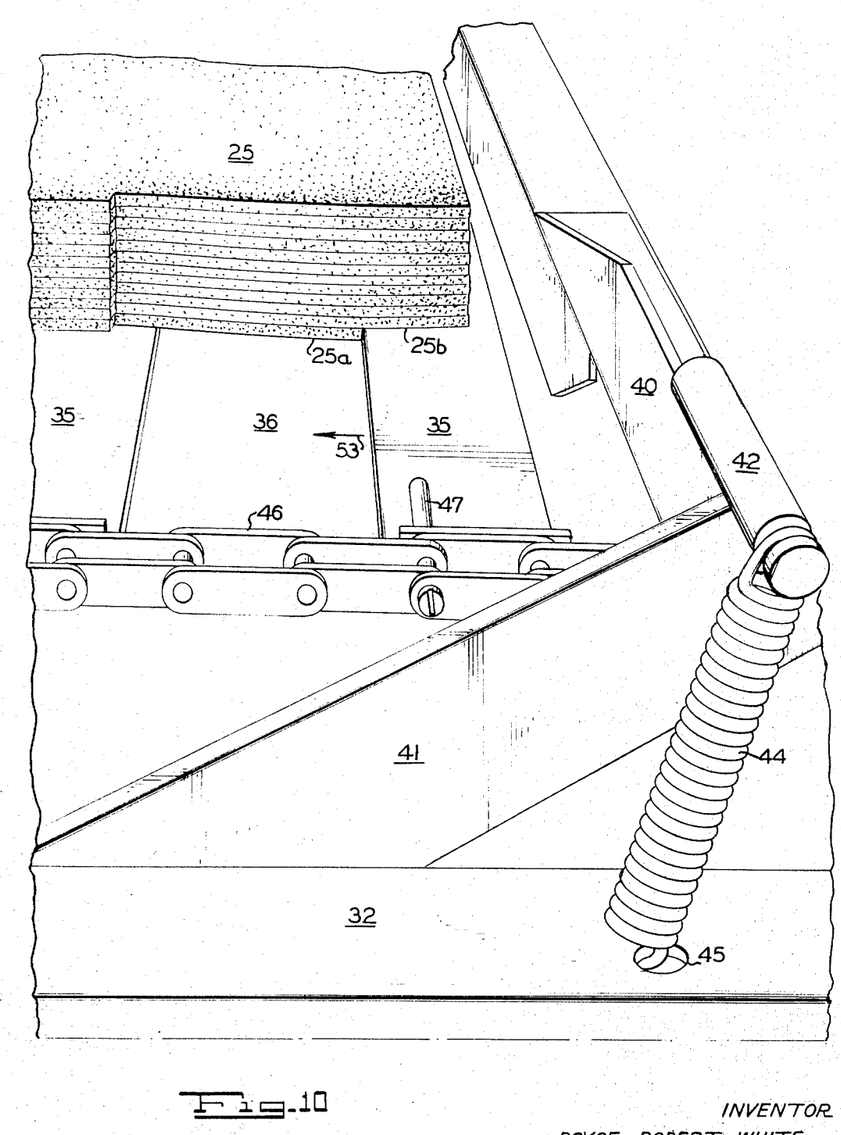
FIG. 10 is a fragmentary perspective view illustrating a spacing bar engaging the bottom shingle of the stack in the shingle feed mechanism.
Figure 12:
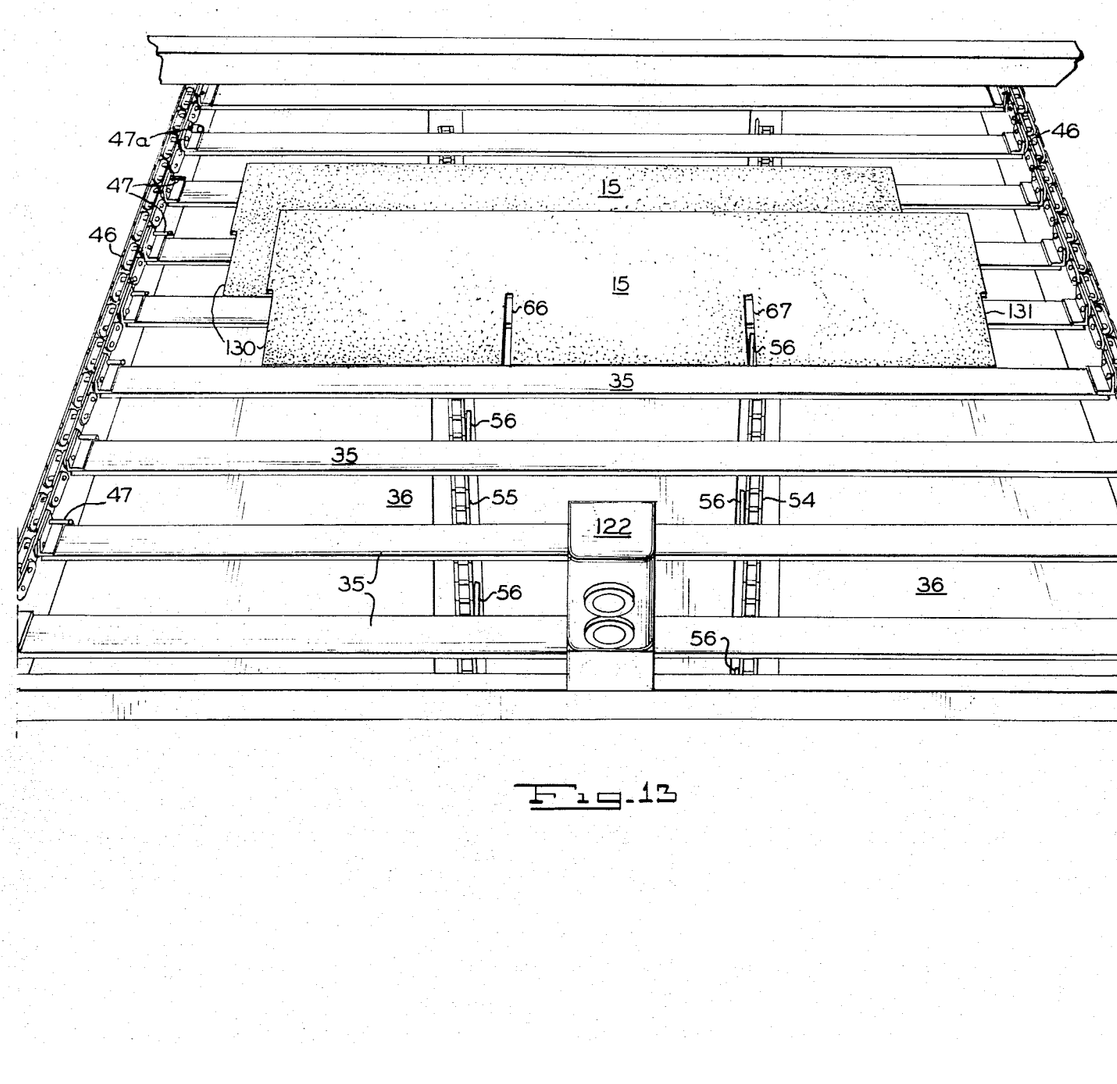

Two roller chains 46 which are a part of endless member 21 have a spacing bar 35 connected between them every fourth link; the chain thus having a pitch of one and one-quarter inches. There is also provided at intervals of every fourth link on the left-hand chain 46 an extended pin 47 which serves as a timing device for purposes which will be hereinafter described. Chains 46 are mounted on sprockets 50 and 51 which are rotatably mounted on frame 32. Chains 46 together with the spacing bars 35 move in the direction of arrows 53 as seen in FIGS. 6a and 10. As the bottom shingle of shingle stack 25 is brought forward and up the incline of table 36, the shingles are disposed in an overlapping position with five inches between the edges of succeeding shingles. This is, of course, the same shingle overlap desired on the roof to be shingled. If a different overlap is desired, it may be obtained by utilizing an endless member 21 with spacing bars 35 spaced apart the desired amount of overlap from leading edge to leading edge.

Figures 9, 11, 12:
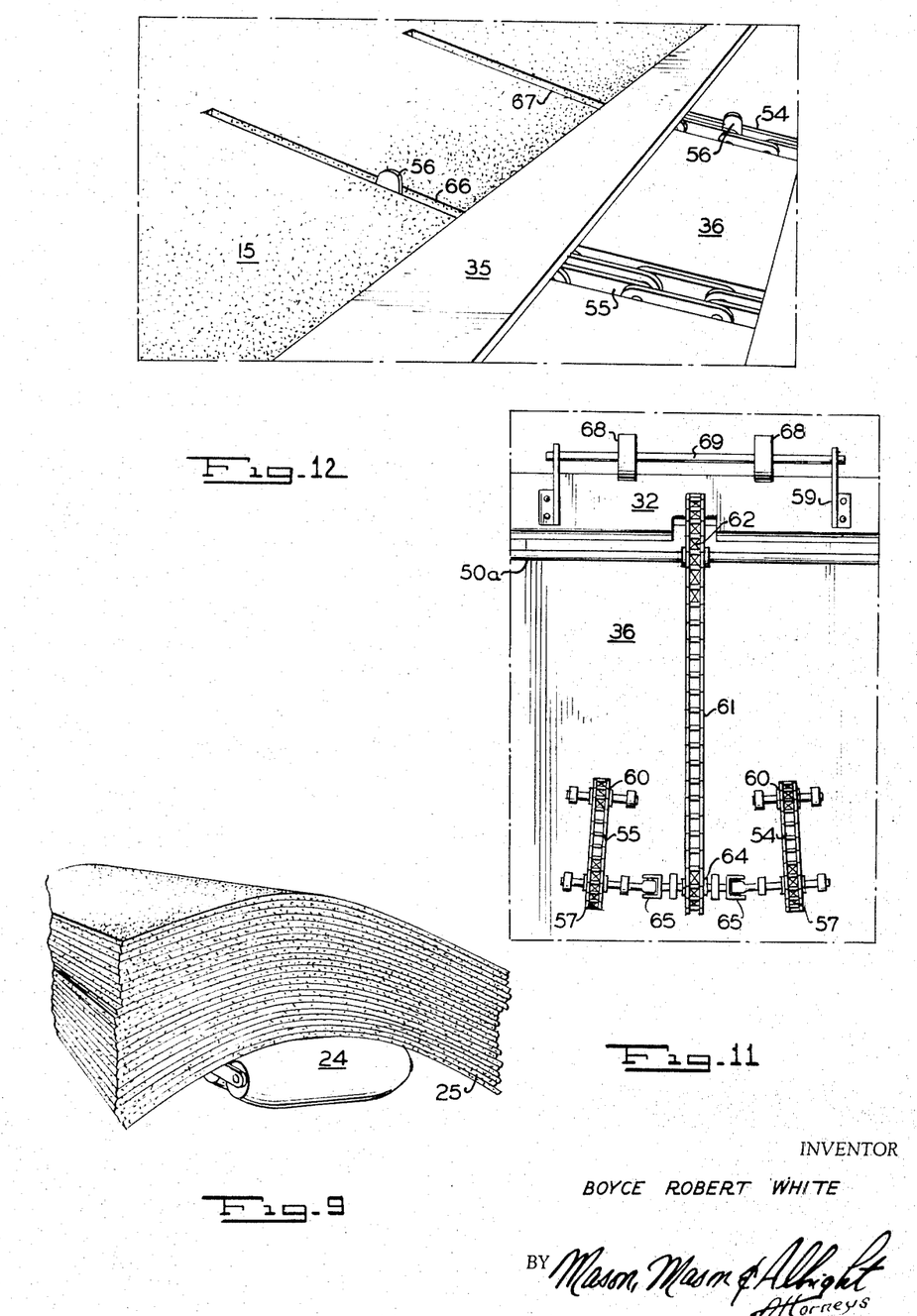
FIG. 9 shows asphalt shingles in a cupped position prior to their being placed in the shingle feed mechanism.
FIG. 11 is a fragmentary perspective view of the underside of the apparatus illustrating the diverging chain for producing a lateral stagger in the shingles on the endless member.
FIG. 12 is a perspective view, with a covering shingle removed for the purposes of clarity, which shows a stagger plate extending from one of the diverging chains engaging the cut-out in an asphalt shingle.
Figure 14:
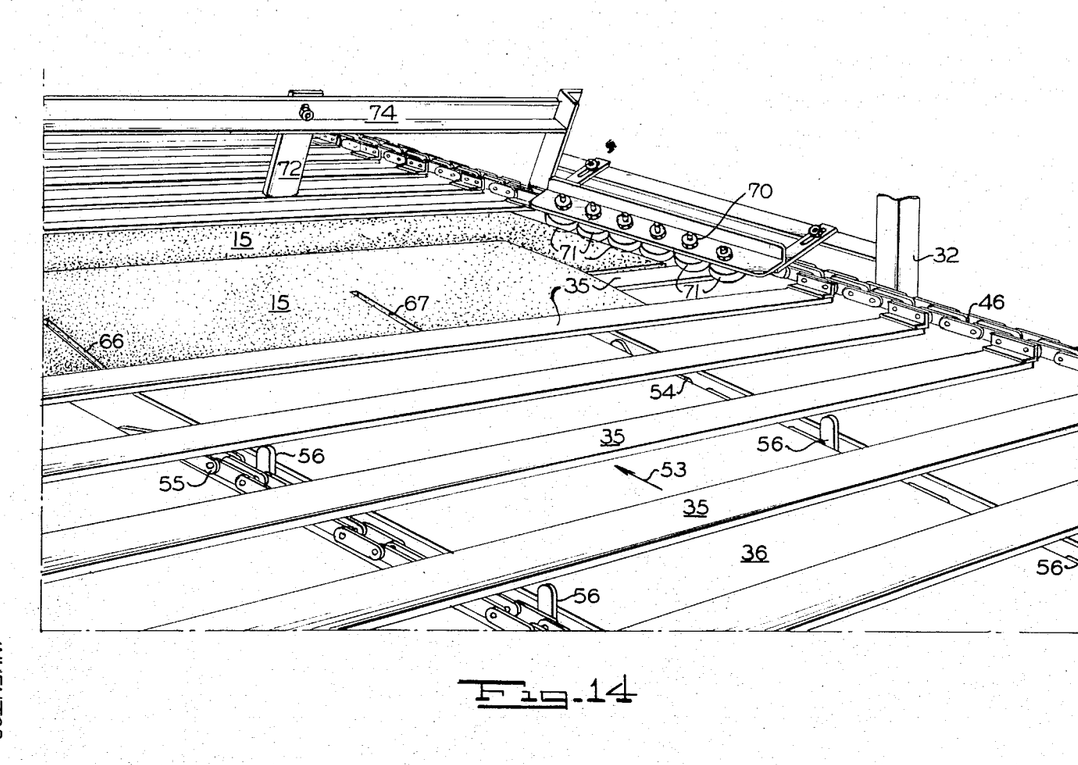
FIG. 14 is a fragmentary perspective view illustrating the squeeze rollers utilized for providing a fine lateral adjustment in the lateral stagger of the shingles.

Upon passing under the back board 27, the shingles are offset the desired amount longitudinally, but are not yet staggered in the lateral sense. This is accomplished by a pair of diverging roller chains 54 and 55 as seen in FIGS. 6a, 11-13. Each chain 54 and 55 have extending outwardly therefrom, at distances approximately ten inches apart, stagger plates 56. Chains 54 and 55 each rotate about a pair of sprockets 57 and 60. The two sprockets 60 are rotatably mounted relative to the underside of table 36 and the same is true with respect to the two sprockets 57. The chains 54 and 55 are driven at the same speed as chain 46 by means of a further chain 61 which is rotated by means of a further sprocket 62 affixed to the shaft 50a of the sprockets 50. The chain 61 on its other end engages a yet further sprocket 64 which drives the sprockets 57 via universal joints 65. It should be understood that with the above described arrangement, the stagger plates 56 have a lateral movement as well as a forward movement with respect to the endless member 21. As each of the stagger plates 56 move outwardly, it engages the cut-out portions 66 or 67 of the above shingle 15. As seen in FIGS. 12, 13 and 14, the stagger plates 56 are staggered in the direction of travel so that those connected to chain 55 are raised in every other space defined by spacing plates 35 and those connected to chain 54 are raised in the alternating of such spaces remaining.

As seen in FIG. 11, a pair of rollers 68 are rotatably mounted on rod 69 which is carried by brackets 59 extending from the end of frame 32. The function of rollers 68 is to guide each spacing bar 35 above the edge of table 36 as it is rotated by sprocket 50.

The stagger chains 54 and 55 diverge a little over three inches each in an outwardly direction so that the stagger produced in the shingles 15 is slightly in excess of six inches. A more exact lateral alignment is obtained through a series of squeeze rollers 70 as seen in FIG. 14. The individual rollers 71 of the squeeze roller assembly 70 each serve to displace the shingles 15 inwardly laterally by about a 64th of an inch so that an exact lateral displacement, as desired, is obtained for the shingles 15. It will be appreciated that a squeeze roller assembly 70 is attached to each side of the frame 32 relative to the endless member 21.

Figure 15:
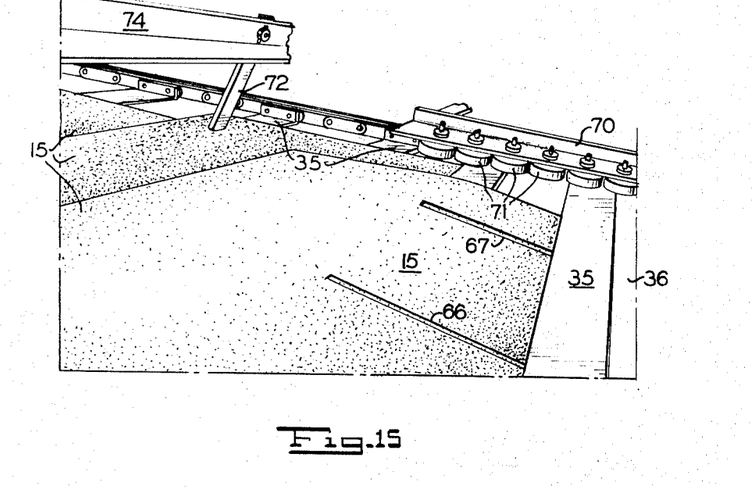
FIG. 15 illustrates in the perspective view a resilient rake which is utilized to ensure that each shingle is flush against a spacing bar prior to the foldable member being applied to the shingle array.

As the shingles 15 proceed in the direction of arrow 53 on the endless member 21 between the squeeze roller assemblies 70, a rake member 72 composed of a resilient steel bar mounted on a cross bar 74 serves to bear against the upper side of each shingle 15 and thus align it flush with its adjacent spacing bar 35 whereby each shingle 15 is aligned both longitudinally and laterally in the desired overlapping position. As the endless member 21 progresses with shingle members 15 disposed as desired thereon, each of the pins 47, which are spaced five inches apart along chain 46, triggers a micro switch 75 mounted on frame 32 (see FIG. 17) which in turn actuates solenoid 78 from a glue dispensing apparatus 76 whereby some 12 beads of glue not greater than 2½" in length are deposited from the barrel assembly 77 of the glue dispensing apparatus 76 onto the exposed sides of the shingles 15 at intervals 17 as they pass thereunder—preferably close to their leading edges. The apparatus for dispensing the beads of glue is known and a description of its exact nature and type is not necessary for understanding and use of the invention by a person skilled in the art. It is therefore not described in detail although attention is invited to U.S. Pat. No. 3,429,482 issued Feb. 25, 1969, E. T. Nord et al. which is directed to a similar apparatus. The beads of glue are initially hot, about 375° F., and are capable of effecting a rapid adhesion to any material which may be applied to the exposed portions of the shingles 15 receiving said beads of glue.

Figures 16, 17:
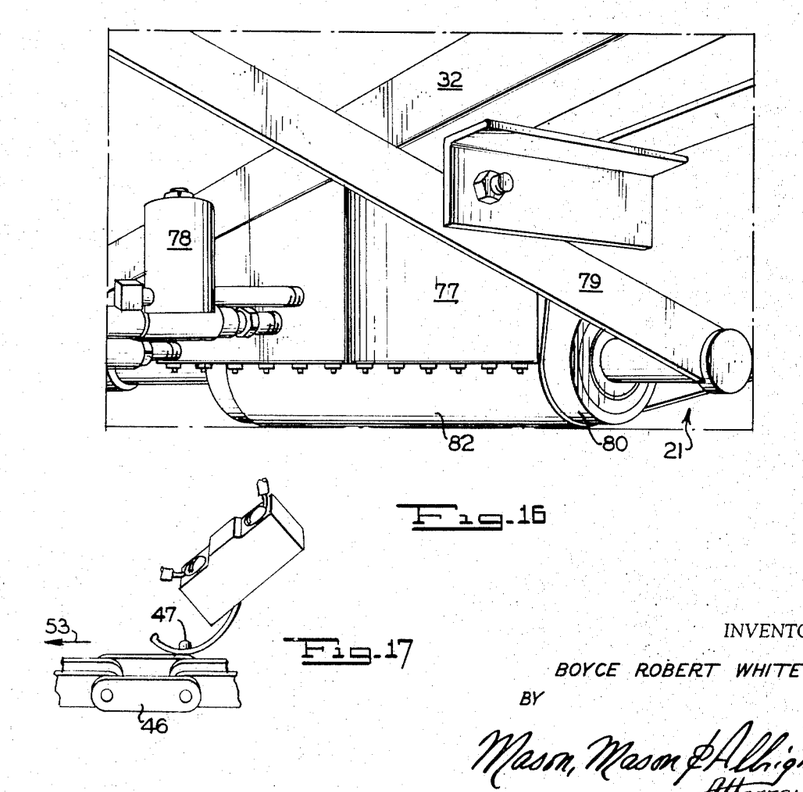
FIG. 16 is a fragmentary perspective view showing the relative position of the nozzle box for the glue dispenser and the nip roller for the foldable member.
FIG. 17 shows the micro switch which actuates the glue dispenser together with a portion of the endless chain.

Immediately beyond the barrel 77, in the sense of direction of endless member 21, is a nip roller 80, mounted from frame 32 so as to be resiliently biased downwardly towards endless member 21 by means of brackets 79 and spring 83 (see FIG. 7) which receives a strip of kraft paper 82 from a roll 81 which is applied to the exposed portion of the shingles 15 having the glue beads deposited thereon by barrel 77.

Figure 18:
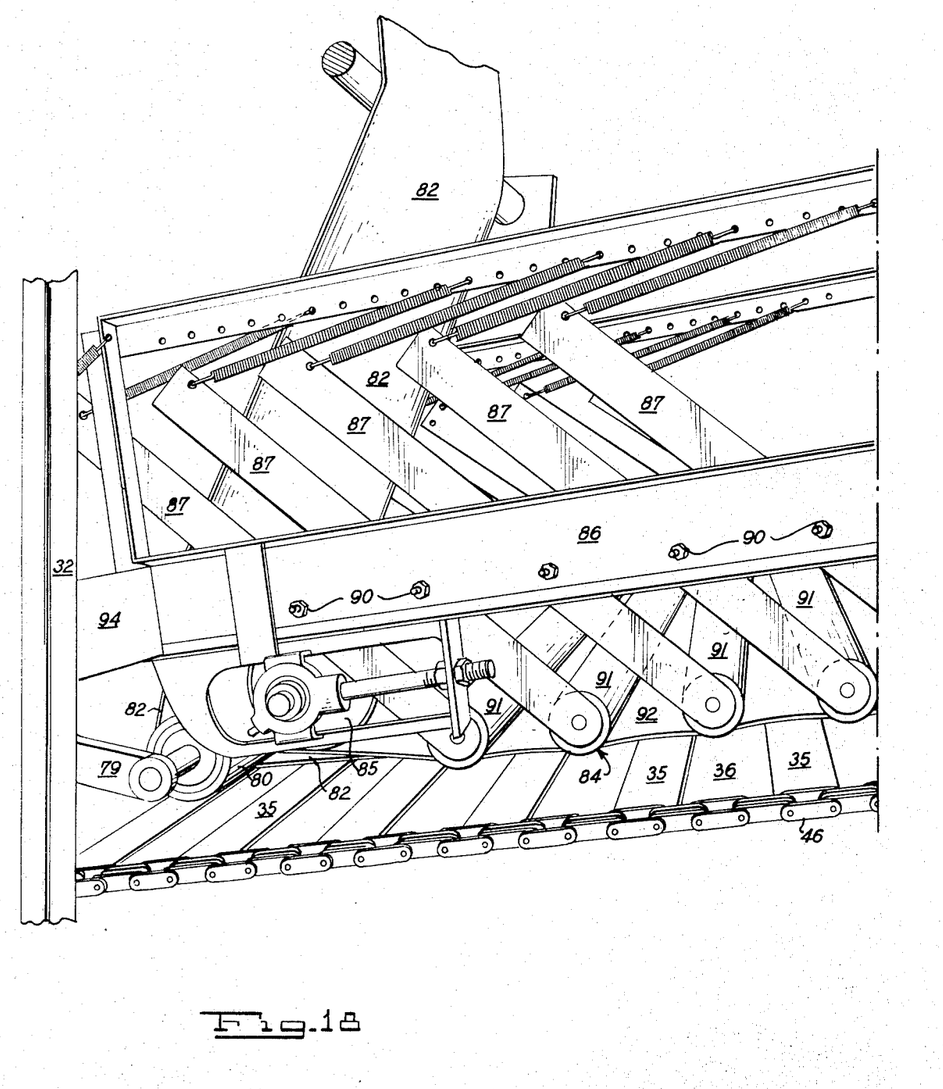
FIG. 18 is a side perspective view of the compression belt mechanism immediately following the nip roller along the endless member of the invention.

The shingles 15 together with kraft paper 82 pass under a compression belt mechanism 84 as seen best in FIG. 18 (where the shingles, however, are not shown for clarity). The compression belt mechanism 84 comprises a large roller 85 journalled to rotate relative to a supporting framework 86 which also supports a plurality of levers 87 which are rotatably mounted on framework 86 by means of pins 90 and carry in their lower aspects a series of rollers 91. A belt 92 extends around the rollers 85 and 91 whereby any shingles passing thereunder with glue applied thereto from the barrel 22 have the kraft paper 82 firmly and securely glued to the heretofore exposed portions of shingles 15. The compression belt mechanism 84 is secured to frame 32 by means of brackets 94.

Figure 19:
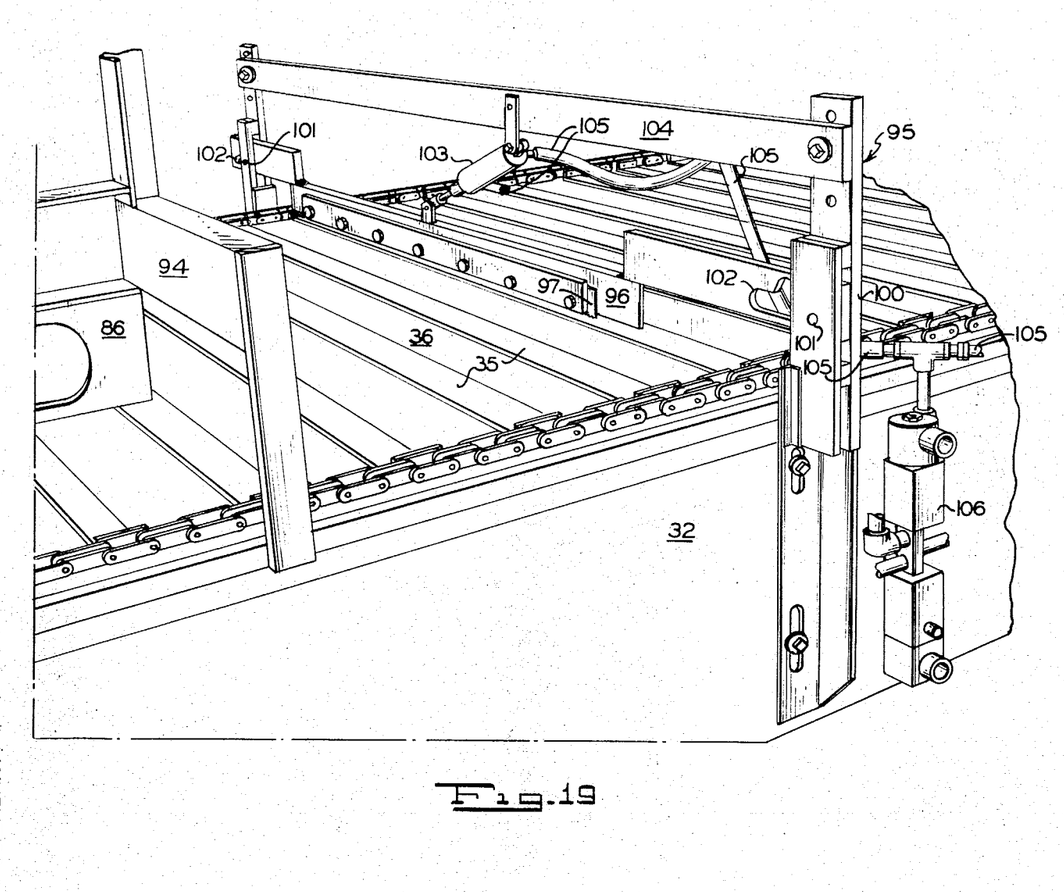
FIG. 19 is a front elevational view of the knife mechanism for cutting the foldable member at predetermined intervals.

Next relative in the direction of the movement of endless member 21 is a knife mechanism 95 which is secured to the frame 32 above the endless member 21. The knife assembly 96 of mechanism 95, including a serrated blade 97, is suspended from a support 100 by means of a pair of pins 101. Knife assembly 96 further includes cams 102 which are received by pins 101. Knife assembly 96, including the serrated blade 97, is moved relative to the support 100 by a quick acting pneumatic cylinder and piston assembly 103 which is disposed between an overhead bar 104, rigidly attached to support 100, and knife assembly 96. When piston and cylinder assembly 103 is actuated, it causes the knife assembly 96 to lower and quickly cut the kraft paper 82 passing thereunder by a rapid back and forth stroke, the serrated blade 97 being dropped and forced into contact with kraft paper 82 by cooperation of cams 102, assembly 103, and pins 101. The lines 105 lead to a pneumatic control device 106 which initiates the necessary motion in the piston assembly cylinder 102. The pneumatic actuator 106 is not described in detail inasmuch as such actuators are conventional and generally widely known and its exact nature or type is not necessary for an understanding and use of the instant invention by a person skilled in the art.

The pneumatic actuator 106 reacts to a micro switch 107 which, as shown in FIG. 6, is similar to the micro switch 75. The micro switch 107 is tripped by a plastic sleeve 47a as shown journalled to one of the pins 47 in FIG. 13. Such a sleeve 47a is located on a pin 47 every twenty spacing bars, the effective length of the endless member 21 thus being a multiple of one hundred inches, so that the piston cylinder assembly 103 is caused to cut the underlying kraft paper 82 every one hundred inches. Accordingly, each array 20 of shingles is one hundred inches in length plus a further seven inches due to shingle overlap. It will, of course, be understood that the apparatus 34 can be adjusted for other lengths or a counting device can, if desired, be utilized in conjunction with the micro switch 107 in which case sleeves 47a are not necessary and knife mechanism 95 can be actuated to operate after the micro switch 107 has been tripped by a predetermined number of pins 47. With, however, the sleeve 47a, micro switch 107 is adjusted so as not to be triggered by the pins 47 alone.

The array of shingles 20 is carried by the endless member 21 until it encounters its turning location at sprocket 51 whereupon it falls onto and is guided by a slide 110. The array continues down the slide 110 until it is received by a shingle receiving and packaging device 111. The device 111 comprises a plurality of L-shaped arms 112 which are hinged on one end by means of a hinge 114 to a roller conveyor 115. When in the position shown in FIGS. 6b and 20, the other end of the arms 112 are supported by a ledge 116 connected to the slide 110. A cardboard wrapper 117 is cradled in the arms 112 so as to have two of its sides extending over the roller conveyor 115.

It has been discovered that the array 20 arranges itself by the forces of gravity alone in the arms 112 and wrapper 117 into a pack of the type illustrated in FIGS. 1–3 as it slides from the slide 110. The lowermost shingle, that is the first shingle received in device 111, corresponding to the shingle 15a and the last shingle received corresponding to shingle 15c.

When an array 20 has packaged itself by gravity as indicated above in the wrapper 117, the arms 112 are moved through an arc 120 to place the array in the position in which it will be opened on the roof. The wrapper 117 with the enclosed array is then secured by straps, glue or other appropriate securing means and finally the wrapped array 20 is removed from the area by means of the roller conveyor 115 for storage or delivery.

The endless member 21 is propelled by a motor 121 which is controlled by a switch 122 mounted on the back board 27 (FIG. 7). Motor 121 is connected to shaft 51a of sprocket 51 by means of an endless member such as a chain or belt 124 received by a sprocket 125 which is directly mounted on shaft 51a and by a further sprocket 126 which is connected directly to the power output shaft of the motor 121. Preferably motor 121 is of a variable type or is combined with a variable speed transmission.

Figure 20:
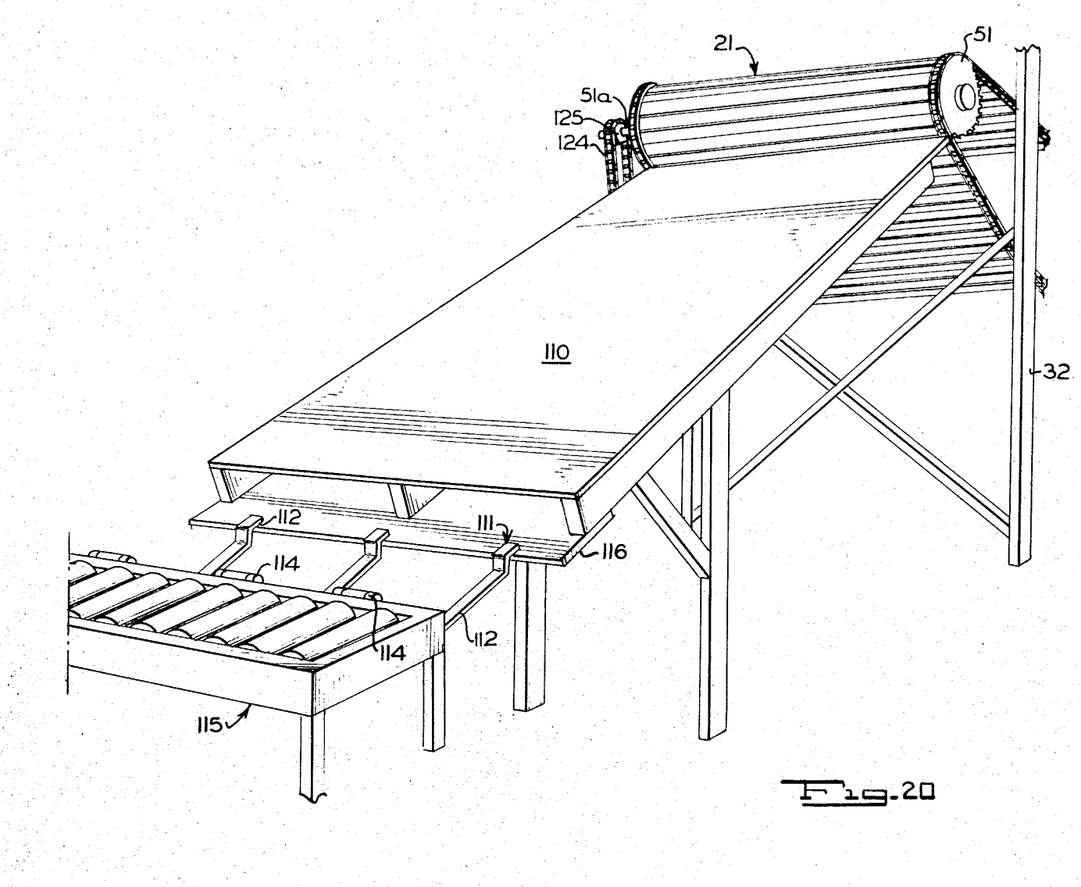
FIG. 20 is a perspective view of the slide and receiving mechanism for the shingle arrays as they move off of the endless member.
Figure 21:
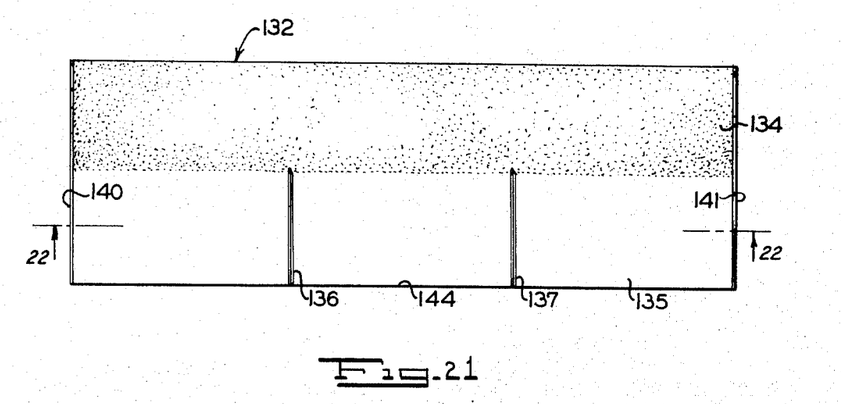
FIG. 21 is a modified shingle in plan view.
Figure 22:
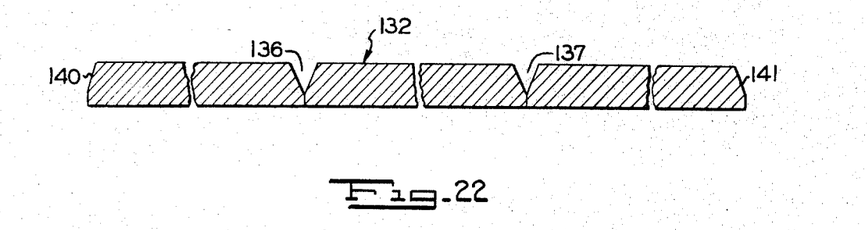
FIG. 22 is a side sectional view of the shingle shown in FIG. 21 taken on lines 22—22.

In operation, a stack 25 of asphalt shingles 15 is first cupped as illustrated in FIG. 9 and conveyed in such cupped condition to the shingle feed mechanism 22. The endless member is started by means of the switch 122 and the vibrator 26 for the shingle feed mechanism 22 is also started. Kraft paper 82 from the roll 81 is brought under the nip roller 80 and the shingle receiving and packaging device 111 is placed in its receiving position with the arms 112 against ledge 116 as illustrated in FIGS. 6b and 20. Shingles 15 are successively sliced off the bottom of stack 25 by means of the spacing bars 35 so as to be in an overlapping condition and subsequently the shingles are alternately moved laterally by the stagger plates 56. The lateral movement is intentionally a fraction of an inch longer than desired and a fine adjustment is made as to the lateral stagger by the squeeze roller assemblies 70 as the shingles 15 pass thereby. The rake 72 ensures that each shingle is in contact with its corresponding spacing bar 35 just prior to the shingle passing under the nozzle barrel 77 wherein twelve beads of hot glue are deposited at intervals 17 on each shingle 15 near its leading edge. This, of course, is not started until shingles commence to pass under barrel 77. Almost immediately thereafter kraft paper 82 is guided into contact with the exposed sides of the shingles so as to be centered in the lateral sense. The paper 82 is brought under the compression belt mechanism 84 whereby it is firmly connected to each individual shingle 15 at intervals 17 by the glue deposited from the nozzle barrel 77. Thereafter every one hundred inches or other predetermined distance, micro switch 107 is actuated and causes knife mechanism 95 to sever the kraft paper 82 in a direction transverse to the movement of endless member 21. The array 20 of shingles 15 thus formed is carried along the endless member 21 until it reaches the vicinity of sprocket 51 wherein it falls by gravity onto slide 110. Array 20 is then guided down slide 110 by gravity and positions itself automatically in the shingle receiving and packaging device 111 in the desired arrangement with the kraft paper 82 disposed between the individual shingles 15. Shingle array 20 is then packaged in a wrapper 117, which has been previously laid in the arms 112 of the device 111 to receive array 20, by pivoting same through arc 120, securing wrapper 117. Array 20 so packaged is then moved from device 111 and a new wrapper 117 is laid in the arms 112 which are positioned against ledge 116 for receipt of the next array to be discharged from endless member. In this connection it will be understood that once the weight of the array 20 on slide 110 is sufficient to overcome the friction holding that portion of the array still on endless member 21, the movement of the array is automatically speeded up due to gravity and very quickly deposits itself in the shingle receiving and packaging device 111. Thus, a period of time exists between the delivery of one array to the device 111 and the commencement of the delivery of the following array to such device. Asphalt shingles 15, as shown in FIG. 1, have cut-out spaces 66 and 67. Also, it will be noted that the edges 130 and 131 which are exposed, are inset one-half the width of spaces 66 and 67. As a result, small portions of the roof which are exposed through the cut-out spaces and the insets, have only a single shingle layer for protection against the elements, and to function as insulation. This problem is avoided by embossing or grooving the shingles where the cut-outs otherwise occur. However, the continuous monolithic shingle which results may tend to warp to the complete detriment of the desired appearance. I have discovered that a bevelled slit largely avoids the disadvantages of the foregoing shingle types and, moreover, cooperates with packaging apparatus 34. Such a shingle 132 is shown in FIGS. 21 and 22.

The shingle 132 has a conventional root or underset portion 134 and an exposed portion 135 which includes a pair of slits 136 and 137. As illustrated in the sectional view, FIG. 22, the slits 136 and 137 are bevelled on the same order as the side edges 140 and 141 of shingle 132.

Figure 23:
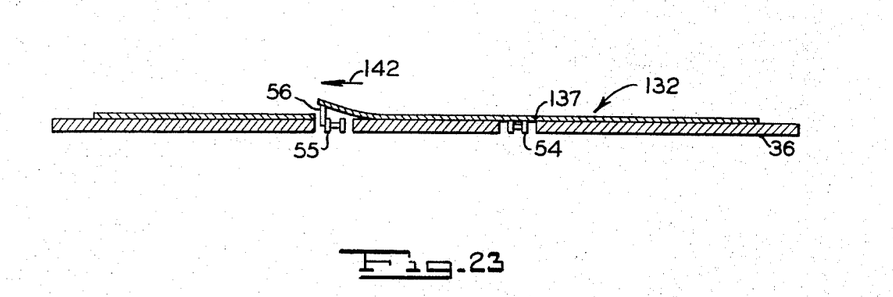
FIG. 23 is a sectional view of the shingle shown in FIGS. 21 and 22 disposed on an endless member looking in the direction of travel of shingles thereon.

FIG. 23 shows shingle 132 after it has been carried by endless member 21 of packaging apparatus 34 to a position on table 36 just beyond sprocket 60. The sprockets 60 are located sufficiently inboard so that stagger plates 56 on chain 55 initially extend above table 36 inboard of split 136. As a spacing bar 35 carries shingle 132 in the direction of arrow 53 along table 36, the stagger plate 56 moves in the relative direction of arrow 142 as seen in FIG. 23, first raising the right-hand edge of slit 136 and then contacting its left-hand edge to displace shingle 132 in the direction of arrow 142. In the succeeded shingle 132, the next stagger plates 56 extending from chain 54 displaces such shingle to the right (opposite arrow 142) in the same manner. When the stagger plates 56 reach sprockets 57, they are withdrawn and slits 136 and 137 return to the configuration shown in FIG. 22. When an array of shingles of the type shingle 132 are applied to a roof, the root portions 134 of the shingles under slits 136 and 137 as well as edges 140 and 141 are not directly exposed to the elements. At the same time, the slits 136 and 137 abbreviate any dislocation.

If desired, roofing cement may be applied directly under bevelled slits 136 and 137 which augments the lasting and protective quality of the roof.

Although I have described the preferred embodiment of my invention, it is to be understood that it is capable of other adaptations and modifications.

Having thus described my invention, what I claim as new and desire to secure by Letters Patent of the United States is:

1. A machine for preparing shingles to be installed on a building which comprises:
 means for arranging an array of shingles including means for laterally staggering said shingles in the overlapping relationship to each other which they will occupy on said building, and
 means for attaching a backing member to the underside of said array while in said relationship.

2. A machine for fastening a flexible backing member to the underside of an overlapping shingle assembly which comprises:
 a frame,
 continuous feed means for said flexible backing member mounted on said frame,
 a mechanism carried by said frame which is adapted to place said shingles into juxtaposition with said flexible backing member, said mechanism including means for staggering said shingles laterally relative to each other prior to bonding the flexible backing member thereto, and
 fastening means for bonding said flexible backing member to the back of each of said shingles a distance apart which is equal to the predetermined overlap of said shingles in said assembly.

3. A machine in accordance with claim 2 wherein said fastening means include at least two spaced apart securing means for bonding said flexible backing member to the back of each of said shingles at least at two laterally spaced apart locations.

References Cited
UNITED STATES PATENTS

| | | | |
|---|---|---|---|
| 2,264,818 | 12/1941 | Wilcox et al. | 198—31 AA |
| 2,712,441 | 7/1955 | Ray | 156—552 X |
| 3,245,192 | 4/1966 | Hilson | 52—748 X |
| 3,055,415 | 9/1962 | Baker | 156—552 |

BENJAMIN A. BORCHELT, Primary Examiner

J. M. HANLEY, Assistant Examiner

U.S. Cl. X.R.

156—561; 52—748